Sept. 14, 1943.　　　J. H. SULZER　　　2,329,491
TEST DEVICE
Filed April 14, 1942　　13 Sheets-Sheet 1
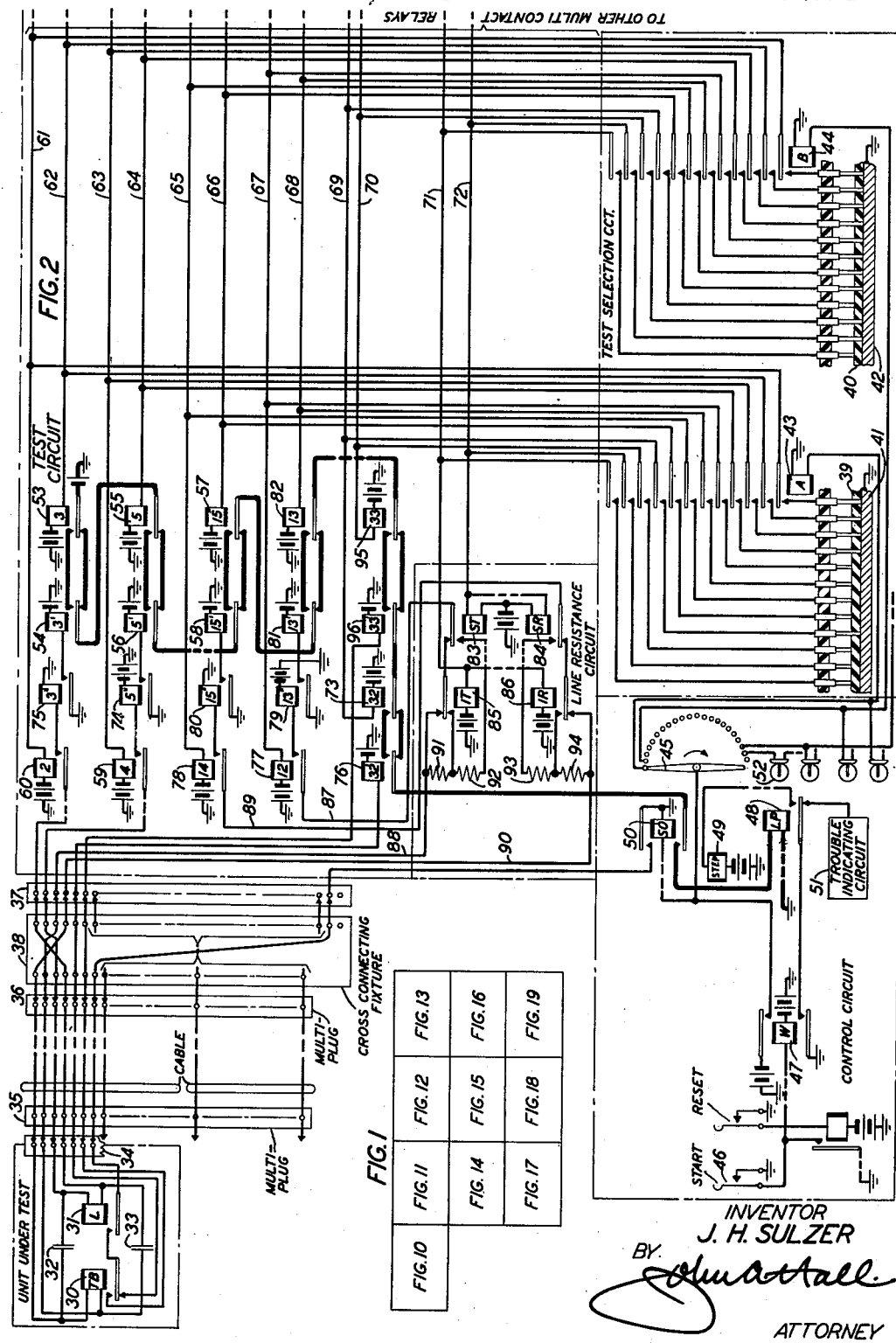
INVENTOR
J. H. SULZER
BY
ATTORNEY Sept. 14, 1943.   J. H. SULZER   2,329,491
TEST DEVICE
Filed April 14, 1942   13 Sheets-Sheet 2

INVENTOR
J. H. SULZER
BY
John A Hall
ATTORNEY

Sept. 14, 1943.　　　　J. H. SULZER　　　　2,329,491
TEST DEVICE
Filed April 14, 1942　　13 Sheets-Sheet 3

INVENTOR
J. H. SULZER
BY
ATTORNEY

Sept. 14, 1943.   J. H. SULZER   2,329,491
TEST DEVICE
Filed April 14, 1942   13 Sheets-Sheet 6
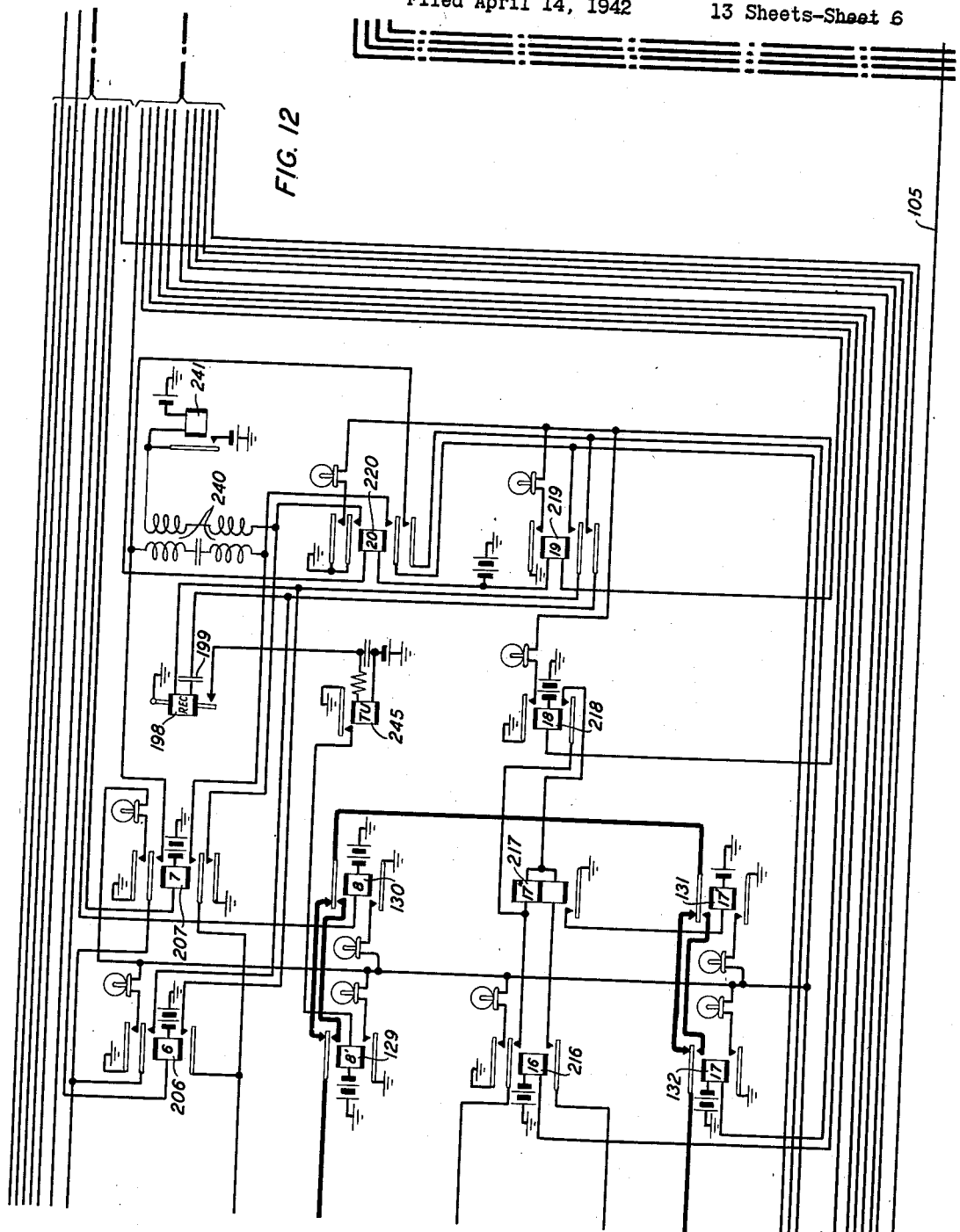
INVENTOR
J. H. SULZER
BY
John A. Hall
ATTORNEY

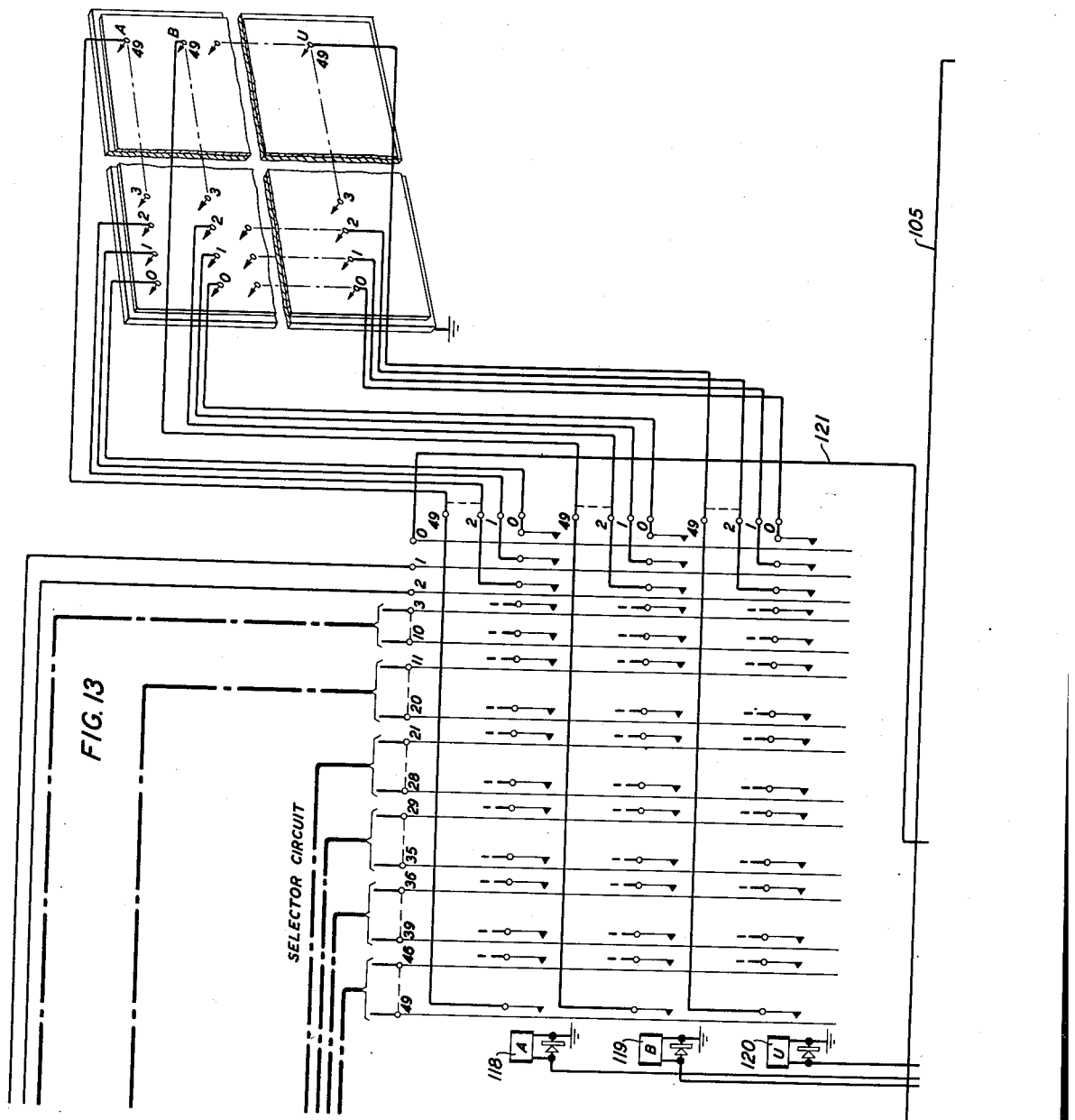

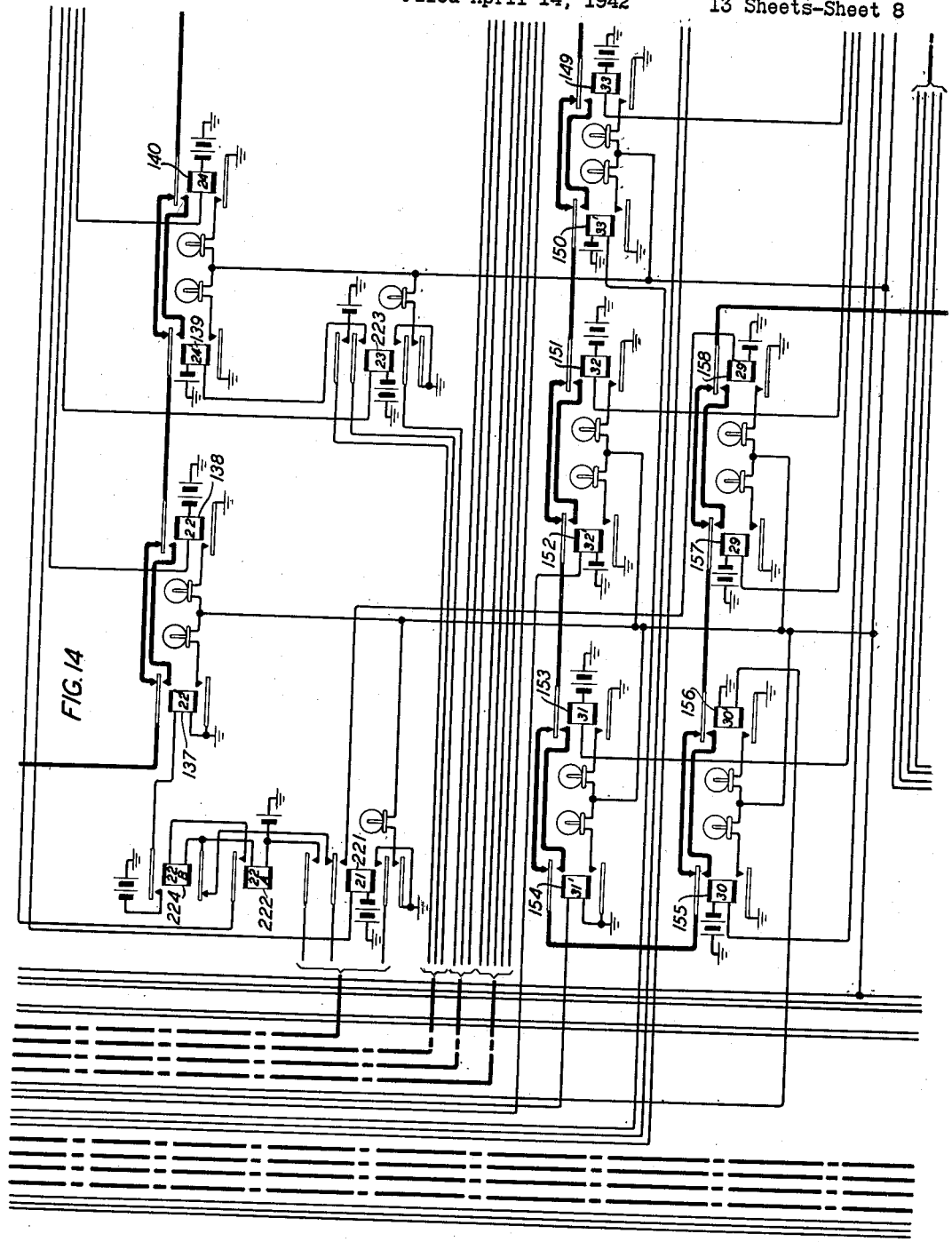

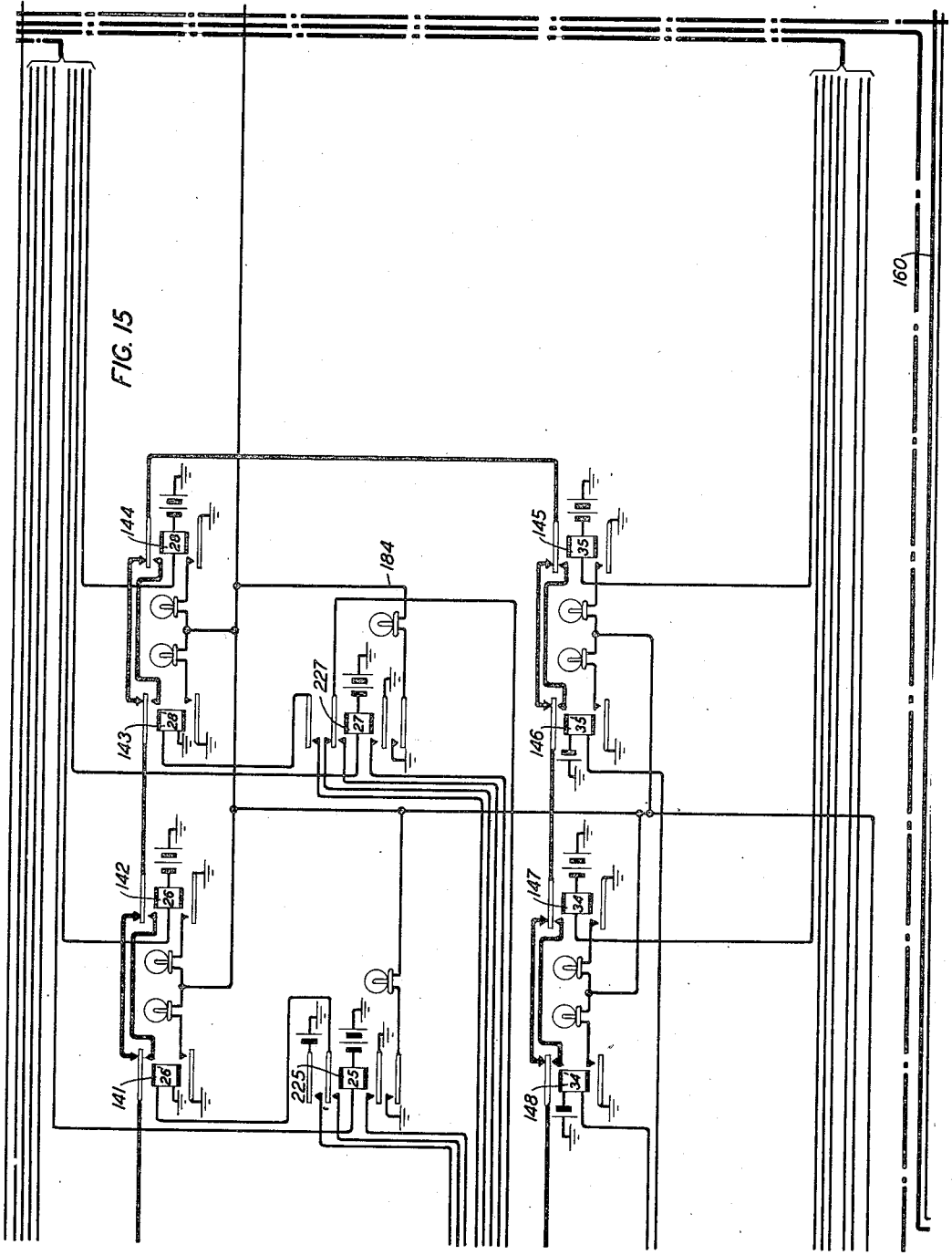

Sept. 14, 1943.  J. H. SULZER  2,329,491
TEST DEVICE
Filed April 14, 1942   13 Sheets-Sheet 10
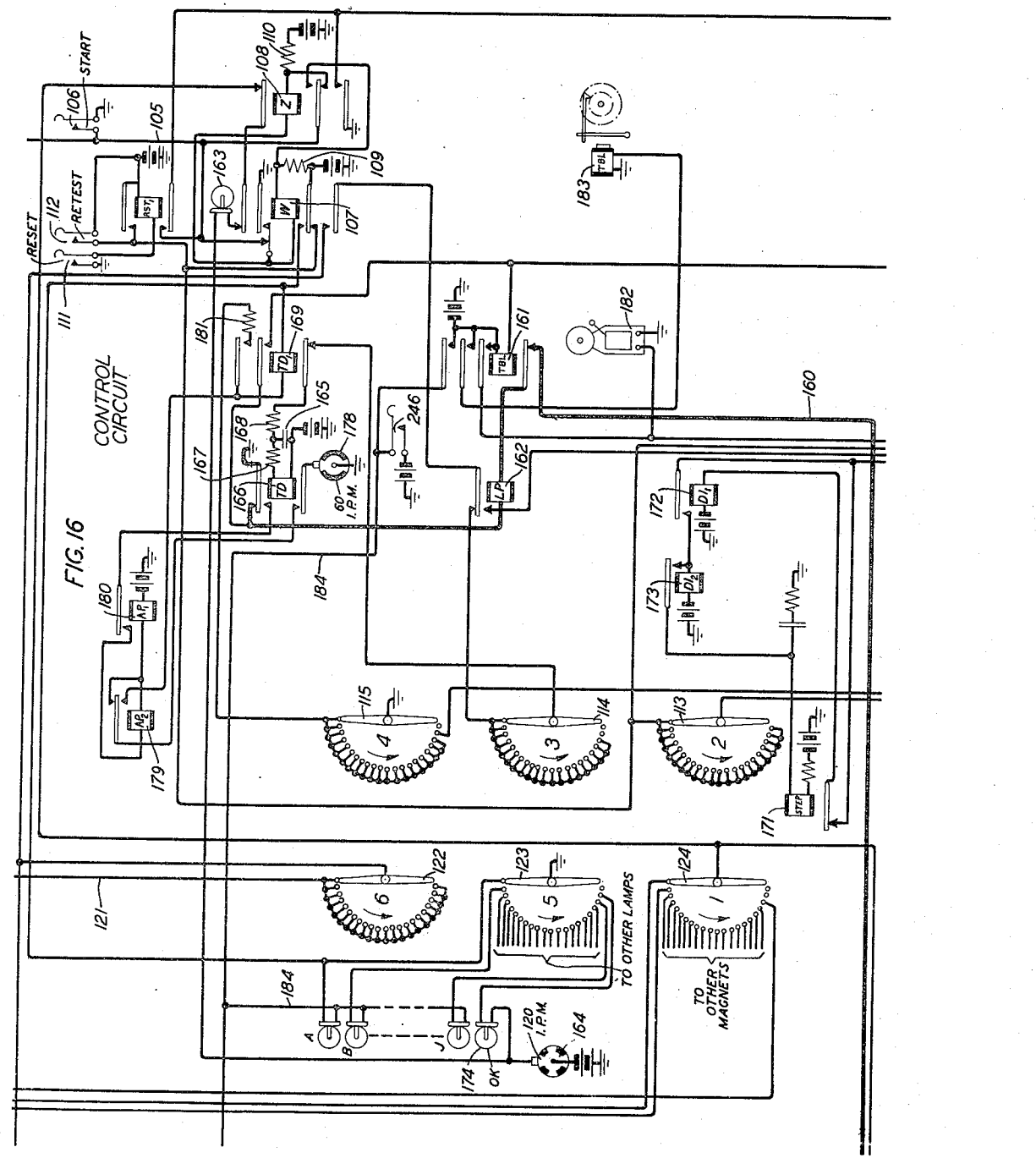
INVENTOR
J. H. SULZER
BY
John a Hall
ATTORNEY

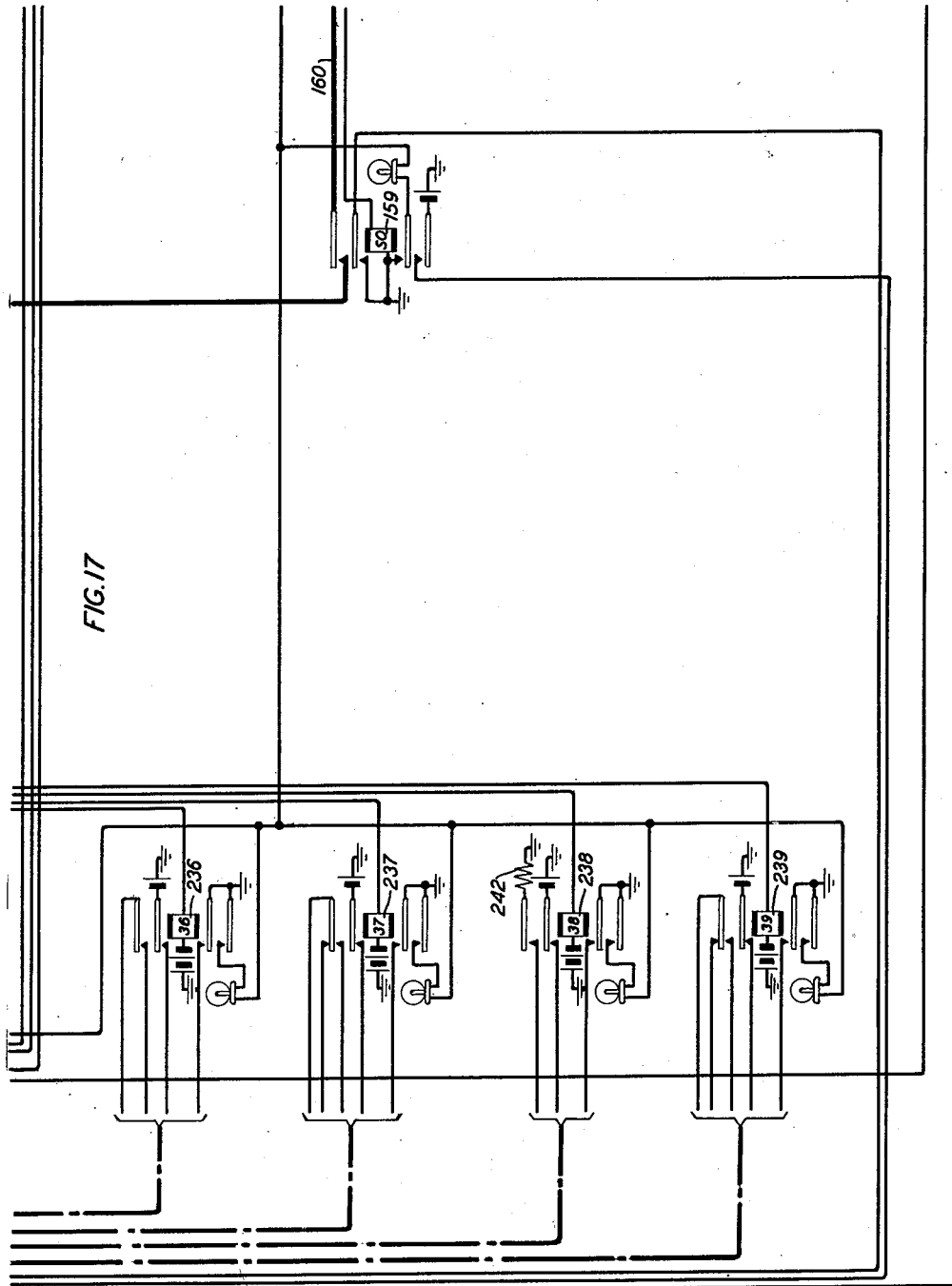

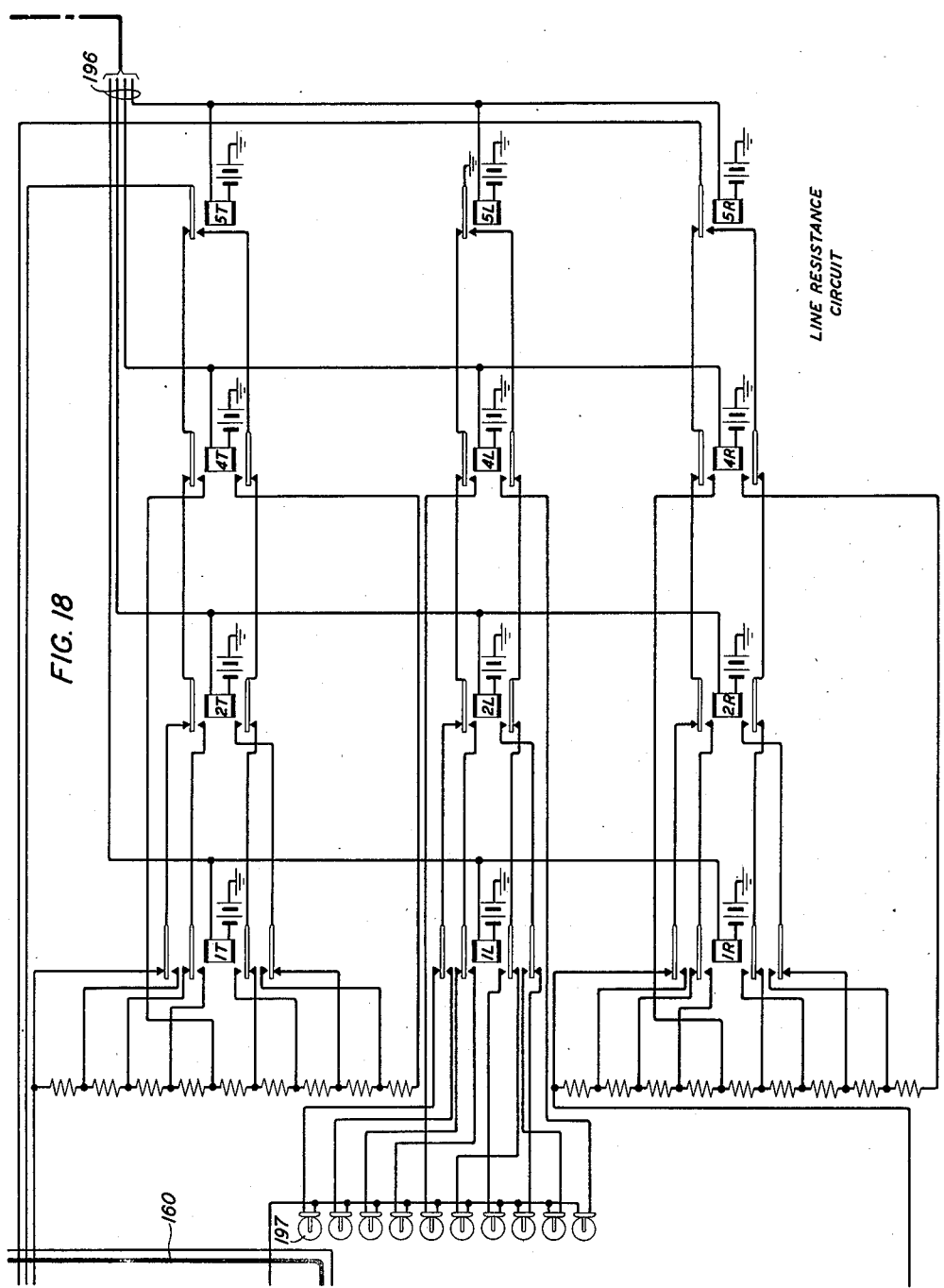

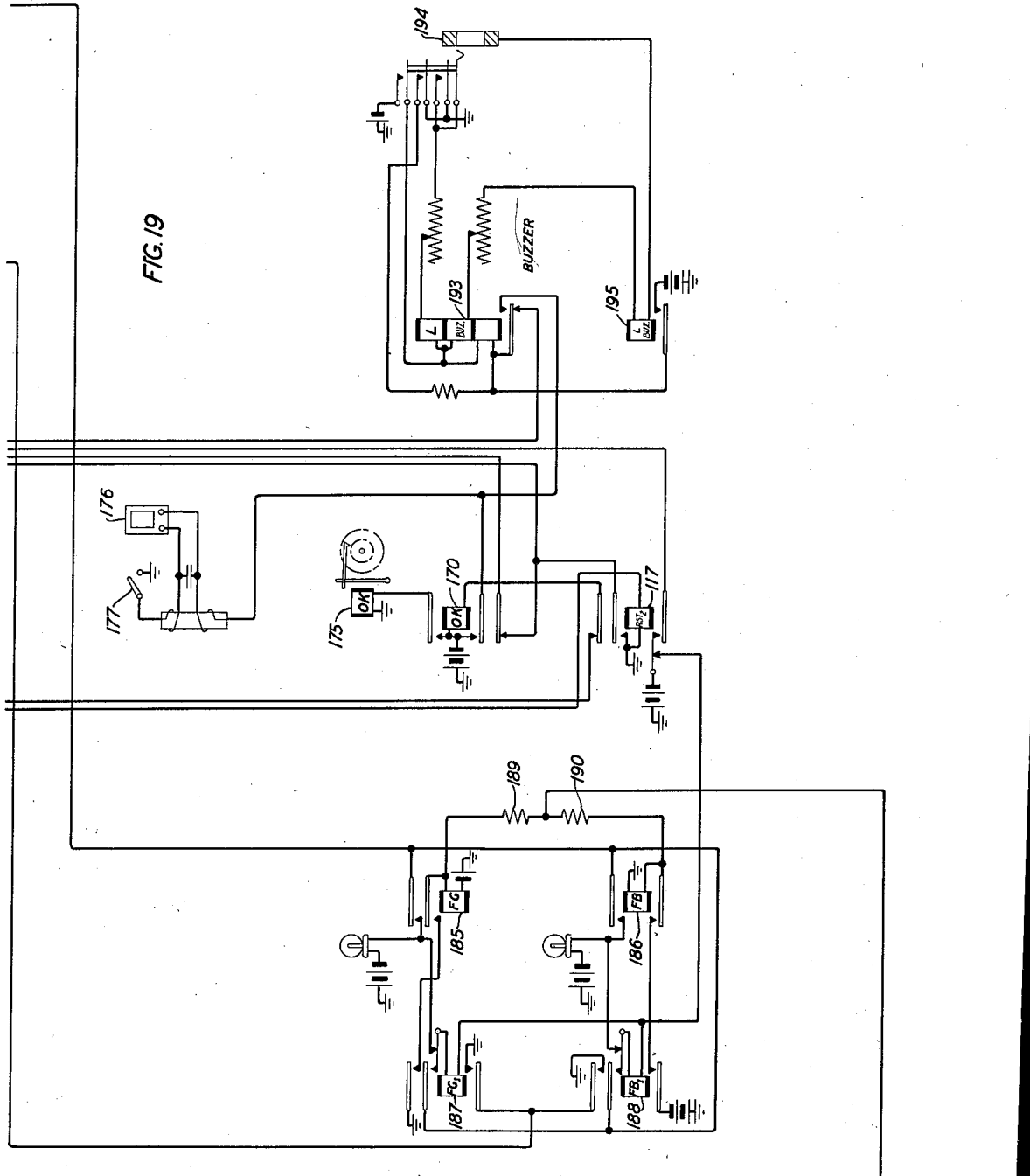

Patented Sept. 14, 1943

2,329,491

UNITED STATES PATENT OFFICE 2,329,491

TEST DEVICE

John H. Sulzer, Westfield, N. J., assignor to Western Electric Company, Incorporated, New York, N. Y., a corporation of New York Application April 14, 1942, Serial No. 438,930

25 Claims. (Cl. 175—183)

This invention relates to control systems and particularly to devices for automatically controlling a plurality of operations according to a prearranged plan.

The object of the present invention is to provide a universal control machine which will automatically control a series of prearranged operations on various types of devices each of which requires a different prearranged series of operations.

A feature of the invention is an indexing means arranged to control a plurality of operations in combination with a means responsive to the successful completion of one series of operations to cause an advance to another series of operations specified by said indexing means and a satisfaction signal responsive to the successful completion of all operations specified by the said indexing means.

By way of example one embodiment of the invention is in a testing machine for testing electrical devices and particularly electrical devices manufactured for use in communication systems though it will be understood that the invention is capable of a variety of uses in widely varying industries.

In manufacturing plants where various types of electrical devices wired into circuits are produced, the testing of the finished articles or the units which may later be assembled into more extensive systems presents a major problem. Manual testing is slow, laborious and open to error which must be carefully checked and rectified and hence automatic testing is preferably employed. Where the device or the article produced is of one design or where very great numbers of any one type are produced, the construction of a machine or device particularly adapted to test such device or article is justified. But where limited numbers of various types of devices are manufactured, it becomes desirable to have a universal type of testing machine which can be readily adapted to the testing of these various types of manufactured devices.

A feature of the invention is a testing device controlled by an adjustable means whereby upon each adjustment the device will automatically make certain various tests predetermined by the said adjustment. In accordance with this feature the device may be set to correspond with the article or device to be tested by an indexing means which will so control the device that appropriate testing operations will be automatically carried out. The testing means consists of a plurality of leads each leading to a relay having a testing operation to perform. Various tests are made by selectively energizing such relays and the indexing means causes the selective operation of said relays.

Another feature of the invention is a means to successively scan the designation of the indexing means. Thus a plurality of different tests may be successively performed.

According to one form of the invention the indexing means may be scanned in toto and the result may be reported piecemeal and successively whereby a plurality of tests may be successively performed.

According to an alternative arrangement the indexing means may be scanned piecemeal, various portions thereof being scanned successively whereby a plurality of tests may be successively performed.

Another feature of the invention is an indexing means in the form of a card or record which may be placed in the machine to cause a plurality of predetermined tests to be performed appropriate to the article or device under test. Such records, one corresponding to each different kind of article or device to be tested, may be prepared and stored in an appropriate location so as to be readily available when an article or device or a plurality thereof is ready for test. When therefore one particular kind of article or device is to be tested the corresponding record is placed in the testing device which when appropriately started will thereafter automatically perform the required tests.

The index card or record may be in any form which will allow selected ones of a plurality of circuits to be closed. It may be in the form of an insulating sheet having conducting means at given spots to close a circuit from one side to the other thereof, or it may be in the form of a punched card which will allow circuits to be closed between a finger on one side pressing toward a conducting plate at the other side thereof, or it may be in the form of the well-known player piano record and its cooperating apparatus. In its preferred form it is a thin sheet of insulating material having holes punched therein at appropriate locations through which sensing plungers may come into electrical contact with an appropriately connected conducting plate.

Another feature of the invention is a chain circuit responsive to the tests being made which is closed when the particular tests being made prove to be satisfactory. Through the use of such a chain circuit a successful test may be used as a signal to advance the device to a succeeding test so that a plurality of different tests may be successively made, the making of one depending on the success of the preceding one. When all specified tests have been performed successively the testing device will display a satisfaction signal, whereupon the device or article under test may be removed and passed as satisfactory.

Another feature of the invention resides in a plurality of pairs of matching relays for controlling the said chain circuit. When a test is to be made, one relay of a pair is used to respond to the test and the other is used to check the fact that the response is satisfactory. This pair of relays will therefore open the chain circuit at one point and close it at another, or in other words both will transfer a portion of the chain circuit to an alternate path which is only effective if both operate concurrently. Each pair of relays tests one circuit detail of the device under test. For instance, one of the relays will be energized if a certain circuit under test is closed and the other relay will check the fact that such circuit should be closed so the concurrent operation of both these relays will maintain the chain circuit closed though a portion of it has been transferred to an alternate path.

Another feature is a pair of matching relays for controlling a chain circuit one of which relays is connected to the device under test to observe the effect of the test and the other of which is connected to the index responsive means to indicate what the effect of the test should be. If both relays operate, the chain circuit is maintained intact as an indication that the device is satisfactory.

Another feature of the invention is a satisfaction means which will respond to a plurality of tests simultaneously made to cause the control device to advance to another operation involving another plurality of tests. The failure of this satisfaction means to operate will result in the operation of a general failure signal. Since each testing feature built around a pair of matching relays has an individual signal, therefore upon the encounter of an unstandard condition, a specific failure signal as well as a general failure signal will be given so that the approximate location of a failure will be given as well as the general fact that a failure has been encountered is given.

Another feature of the invention is a normally open circuit for the said test feature or specific failure signals, controlled by the satisfaction means. When a failure is encountered and the satisfaction means therefore fails to operate, means is brought into operation for operating the general failure signal and to close the said normally open circuit so that the specific failure signals will become effective.

In operation a connecting device designed to cooperate with the standard terminal block in which the circuits of the various devices or articles terminate is clamped to such terminal block and the device or article is placed or mounted in approximately the same position it will have in actual service. The starting switch is operated and the test is then made automatically until a satisfaction signal is operated. Thereupon the connecting device is transferred to another terminal block and another device is tested. So long as the satisfaction signal is regularly given, the only duty of the operator is to associate the articles or devices to be tested with the device of the present invention and to see that the test is properly started. The whole operation is a matter of a few seconds as compared with several minutes occupied in making equivalent tests under old manual methods, and it has the advantage that mistakes through inattention and fatigue are eliminated. Every test prescribed must be performed and every test must prove successful before the satisfaction signal will be given.

The various devices to be tested usually comprise complicated electrical circuits and all terminate in standard terminal blocks. While it is possible to connect the testing machines to these blocks it is usual to interpose a cross-connecting means to adapt the testing circuits to the particular device under test. Hence some type of cross-connecting means is employed. This may be in the form of a plug and jack arrangement, a cross-connecting switch or a prearranged jig. The specific means shown herein is a prearranged jig which may be considered as part of the indexing means since one such jig will correspond to each different index card used. Therefore to set the machine for testing a particular device a card and a jig each corresponding to such particular device will be placed in the machine. The cross-connecting jig will determine the proper relationship between the testing circuits and the circuits under test and the card will determine the particular tests and the sequence thereof to be performed.

A feature of the invention is an indexing means which will determine the proper relation between the testing circuits and the circuits under test and the proper tests and sequence of tests to be performed.

Another feature is a prearranged cross-connecting device which may be interposed between the terminals of the test circuits and the terminals of the circuit under test.

Another feature is a plug arrangement having a plurality of terminals which may be variously interconnected according to some prearranged plan and which may be cooperatively associated with a jack arrangement having one plurality of terminals connected to a testing circuit and another plurality of terminals connected to a circuit under test. Other features will appear in the following description.

The drawings consist of thirteen sheets containing the following figures.

Fig. 1 is a diagram indicating the manner in which Figs. 10 to 19 may be placed together to form a complete circuit diagram.

Fig. 2 is a schematic circuit diagram by means of which the basic principles of the present invention may be explained.

Figs. 10 to 19 inclusive, when placed as indicated in Fig. 1 constitute a complete circuit diagram showing the various features of the present invention.

Fig. 20 is a schematic circuit diagram to explain the fundamental theory of operation of the invention.

A great deal of communication apparatus is manufactured in the form of apparatus units, comprising a mounting plate on which certain pieces of apparatus are mounted and completely wired. The wiring for each unit leads to a terminal block of the general design of that shown in the following patents:

1,537,081, Graham, May 12, 1925; 1,685,847, Huntington, October 2, 1928; 1,930,275, Knowlton, October 10, 1933.

A variation of the termination of the apparatus unit is shown in the following patent:

1,809,025, Cruser, June 9, 1931.

The general object of the invention is to provide means for rapidly and accurately testing these apparatus units and hence means in the testing device are provided for rapidly connecting the circuits of the apparatus unit to the testing device. This means may take any well-known form as a multiple plug such as that shown by way of example in Patent 2,158,630, Lloyd, May 16, 1939.

The procedure is to make connection to the terminals of the apparatus unit, place appropriate indexing means in the testing device, and start the testing operation. A plurality of tests will be automatically made and if the result of these tests is satisfactory the testing device will advance to another series of tests. When the total of the tests designated by the indexing means have been made and if all tests have been satisfactory a satisfaction signal will be displayed. Thereupon the attendant may pass the apparatus as satisfactory and proceed to make connection to another apparatus unit. If this is of the same variety the indexing means will not be disturbed but if it happens to be of another design then indexing means appropriate to such new design will be placed in the testing device.

The indexing means for use in the testing device of the present application consists broadly of two parts, one a card of insulating material with hole punched therein at selectively predetermined points, similar in principle to the well-known statistical card, and two, a cross-connecting device, for connecting the apparatus under test to the proper points in the testing circuit.

Figure 3:
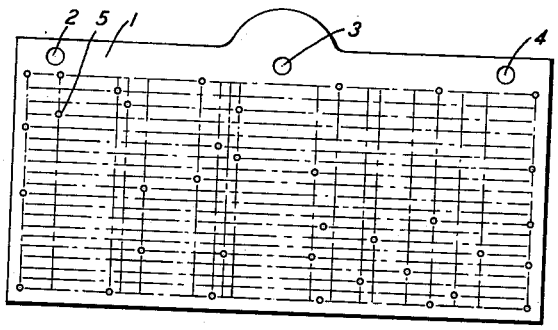
Fig. 3 is a plan view of one of the punched insulating cards used as an indexing means.

The index card is shown in Fig. 3. It consists of a flat piece of insulating material 1, through which standard guide holes 2, 3 and 4 are cut for the purpose of properly centering the card and through which numerous other holes such as 5 are punched as selectively predetermined points. The predetermination of the points at which these holes are to be punched is part of the engineering work performed in the design of a particular apparatus unit.

Figure 4:
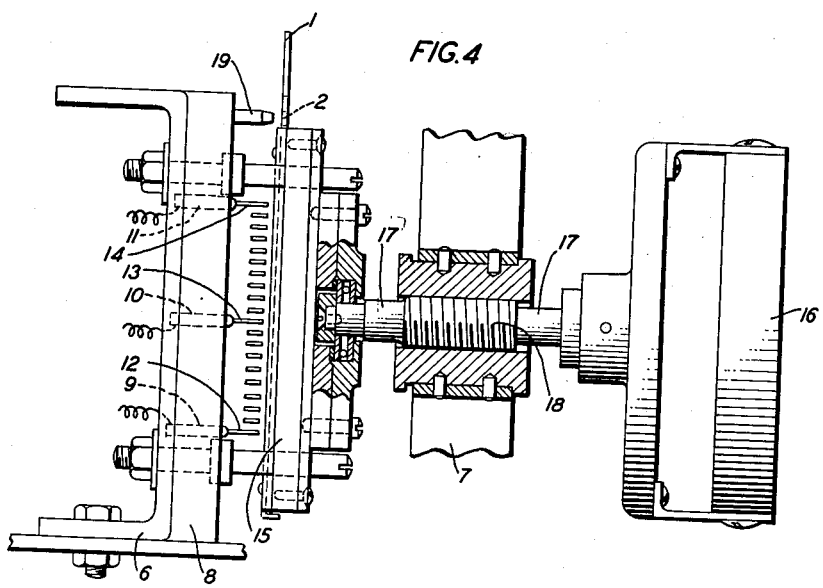
Fig. 4 is a view partly in section of the means employed to establish connections selectively determined by the indexing card of Fig. 3.
Figure 5:
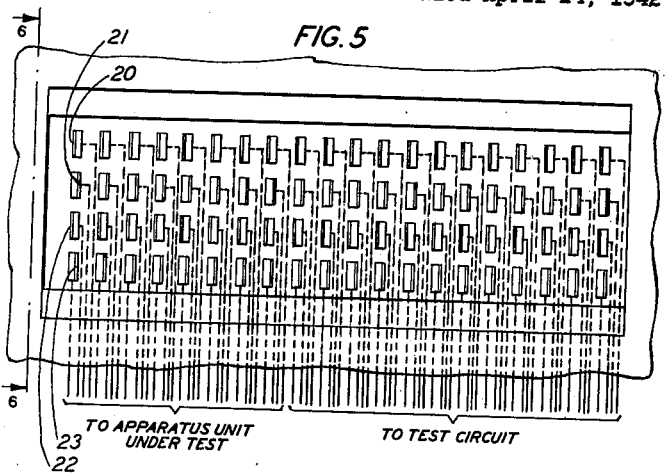
Fig. 5 is a front view of a jack.
Figure 6:
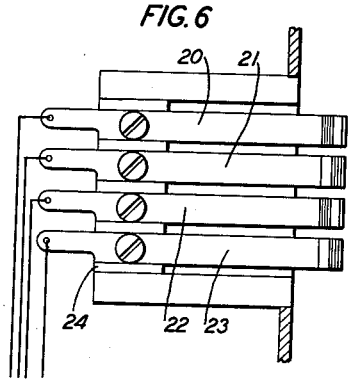
Fig. 6 is a sectional side view of the same.

The testing device in its mechanical embodiment is not shown in full. Parts 6 and 7 are parts of the frame of the device. A plate of insulating material 8 has fixed therein a plurality of connectors 9, 10 and 11 each provided with a plunger 12, 13 and 14 respectively which will give when the card 1 is moved toward the left. If such plunger encounters a punched hole in the card then it will extend through the said card and make electrical connection with the grounded plate 15. As shown in Fig. 4 the card 1 has been placed in the testing device but has not yet been moved toward the left. Thereupon the handle 16 is grasped and turnd in a clockwise direction whereupon the shaft 17 through the action of the screw threads 18 will be moved toward the left. By means of centering pins such as 19 engaging the centering holes 2, 3 and 4 the card is properly positioned so that as it further advances toward the left those plungers, of which there is one for each position on the card, which are positioned before a hole will make contact with the grounded plate 15. Other mechanical details shown in Fig. 4 will not be described, it being only necessary to show how the card 1 is inserted in the device and then moved to the point where certain predetermined plungers are electrically affected.

Also secured to the frame of the testing device is a jack consisting of a plurality of jack springs such as 20, 21, 22 and 23 fixed to some convenient insulating base 24. These terminals, as will later appear, are partly connected to the leads extending to the apparatus under test and partly connected to the testing circuit.

Figure 7:
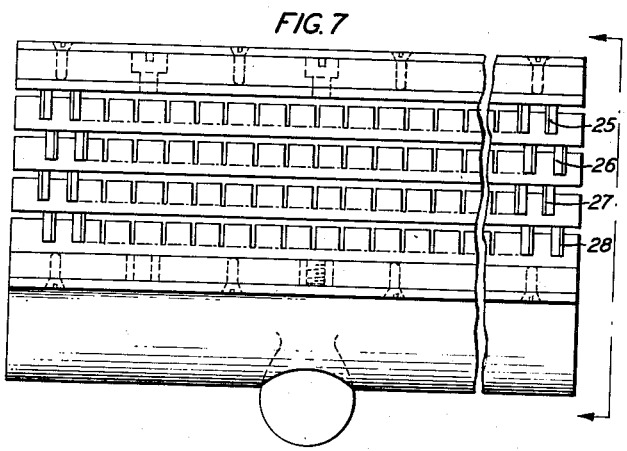
Fig. 7 is a front view of a plug designed to cooperate with the jack of Figs. 5 and 6.
Figure 8:
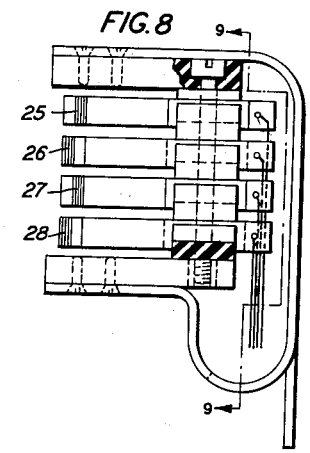
Fig. 8 is a sectional side view of the same.
Figure 9:
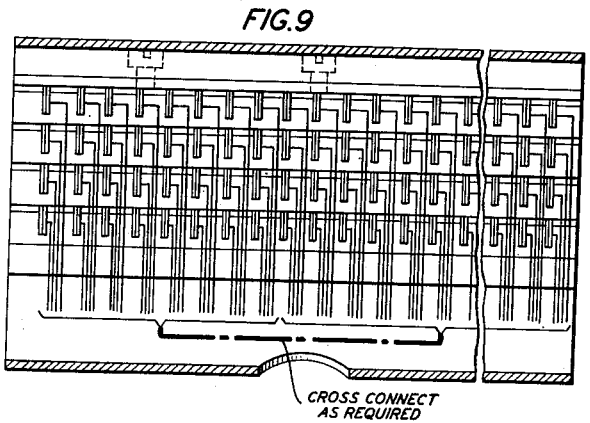
Fig. 9 is a sectional front view of the same taken on line 9—9 of Fig. 8.

A cooperating plug arrangement is shown in Figs. 7, 8 and 9. Here an equal number of springs such as 25, 26, 27 and 28 are secured to an insulating base and are equally spaced to cooperate with the jack springs. As indicated the jack springs and the plug springs are bevelled at their tips so that when the plug is presented to the jack and pushed home the jack springs of the first and third rows will slide to the right of the cooperating plug springs and the jack springs of the second and fourth rows will slide to the left of the cooperating plug springs and the whole plug will remain in position by the frictional engagement of said springs. Other mechanical details of the plug and jack of Figs. 5 to 9 will not be further described since such details are not germane to the present invention. The important point is that leads from the apparatus under test and leads from the testing circuit terminate in the springs of a jack and may be variously interconnected by a plug. Thus the springs of the plug may be interconnected in a predetermined manner to correspond to a particular apparatus unit and there may be as many of these plugs each with its springs differently interconnected as there are apparatus units to be tested.

The cross connection of the leads from the apparatus to be tested and the leads to the testing circuit may be done by well-known patching cord plug and jack arrangements, and where such arrangements are employed then the card of Fig. 3 becomes the indexing means. Where the plug with its predetermined cross connections is employed, then such plug becomes part of the indexing means along with the cord. Hence there will be at hand both a card and a cross-connecting plug to correspond to each apparatus unit to be tested. When a particular unit is to be tested the cord and the plug corresponding thereto are placed in the proper positions in the testing device and the test made.

The fundamental theory of operation of the testing device is shown in Fig. 20. The indexing means for each test will operate two relays, one known as the key relay and the other known as the watching relay. The watching relay immediately opens the chain circuit and therefore the circuit of what may be termed the satisfaction relay. The chain circuit is opened at the back contact of the watching relay and transferred to the front contact thereof. The key relay imposes a condition on the device under test. In the example given it closes a circuit through the device under test so that if this circuit is complete as it should be a lamp relay will be operated. The lamp relay repairs the break in the chain circuit caused by the watching relay and therefore causes the energization of the satisfaction relay, whereby an advance is made in the testing device to another test.

Referring now to Fig. 2 the principle of operation of the testing device of the present invention will be described. At the top left-hand corner of this figure there is shown a circuit included within a broken line rectangle labelled "unit under test." This is an apparatus unit of extremely simple design including two relays 30 and 31 and two condensers 32 and 33. The relay 30 has an armature with both a front and a back contact and the relay 31 has an armature and a single front contact. These pieces of apparatus are wired in a circuit terminating in a terminal block 34. By means of a multiplug 35 this circuit may be extended toward the testing circuit. The multiplug 35 may be of any well-known design or it may be of the design shown in my copending application Serial No. 328,644, filed April 9, 1940. The circuit from the multiplug 35 extends to terminals on a block 36 which will be understood to be jack springs of a jack such as that shown in Figs. 5 and 6. The block 37 is a similar piece of apparatus and represents other jack springs of the same device. The multiplug 38 represents the plug of Figs. 7, 8 and 9 so that it will be apparent how the circuits from the apparatus unit under test are connected to the testing circuits by a predetermined cross-connecting pattern in the plug 38. The plug 38 has been prearranged to correspond to the particular apparatus unit under test and shown in the upper left-hand corner of this figure.

The indexing card 1 is now placed in the testing device and the plate 15 pushed home. In this figure the elements 39 and 40 represent portions of the indexing card 1 and the elements 41 and 42 represent portions of the plate 15. Since the plungers are arranged in coordinate rows it is arranged to make a plurality of tests designated by the punching in each row of holes in the card, and a multicontact relay is provided to connect each row of plungers in turn to the testing circuit. Thus multicontact relay 43 will connect one row of plungers with the testing circuit and relay 44 will connect another row of plungers with the testing circuit.

A stepping switch represented by the wiper 45 is provided to cause the energization of the multicontact relays in turn. The wiper is shown in its normal position ready to start a complete test of an apparatus unit.

The testing operation is started by operation of the start key 46 which results in the operation of relay 47. This relay in turn extends battery to the wiper 45, which is effective at this time to cause the operation of the first multicontact relay 43. Battery is also extended to the winding of relay 50 which will close the chain testing circuit to the winding of relay 48 and cause the operation of this relay, providing the chain circuit is properly closed. If the chain circuit is open, indicating trouble, then relay 48 will not operate with the consequence that relay 47 will extend a ground through the back contact of relay 48 to a trouble indicating circuit 51. The operation of multicontact relay 43, however, causes the chain circuit to remain open in preparing the circuits for the first group of tests. Relay 48 will remain unoperated and ground will be extended to the trouble indicating circuit. This circuit, however, is slow to respond and it will be normally opened again before any response is had. Thus, if the tests are satisfactory the chain circuit will be closed again almost immediately and relay 48 will operate before the trouble indicating circuit responds.

This cycle is repeated again and again until the wiper 45 reaches the terminal leading to the satisfaction signal 52 which indicates that all tests designated by the indexing card 1 have been performed and all have proved to be satisfactory.

The chain circuit consists of a path from battery leading through the armatures and contacts of a plurality of pairs of relays. Thus the chain circuit starts at the armature of relay 53 and passes in turn through the armatures of relays 54, 55, 56, 58, 57 and 50 to the winding of relay 48. Relays 53 and 54 form a pair, so that if relay 53 is operated by direction of the indexing means then relay 54 must be operated as the result of a successful test to match the operation of relay 53 to reclose the chain circuit. It will be noted that relay 53 transfers the chain circuit from its back to its front contact and thus opens the chain circuit. If the test is satisfactory relay 54 will operate and again pick up the chain circuit at its front contact.

It will be noted that when relay 43 is operated, conductors 60, 61, 62, 63 and 64 are grounded, resulting in the operation of relays 73, 60, 59, 53 and 55. Thus immediately upon the operation of multicontact relay 43 the chain circuit is broken at three points, namely the contacts of relays 53, 55 and 73. However, through the energization of relays 60 and 59 a test circuit is established from battery the winding of relay 74, contact and armature of relay 59, through the springs of jacks 36 and 37 and the cross-connecting plug 38, the plug 35 and the terminal block 34, the winding of relay 31, thence back to the armature and contact of relay 60, through the winding of relay 75 to ground. If this circuit is properly closed, then both relays 74 and 75 will respond and by causing the operation of relays 56 and 54, respectively will repair the breaks in the chain circuit caused by relays 55 and 53, respectively.

The current through the windings of relays 74, 31 and 75 in series should cause the operation of relay 31. Therefore, ground is supplied to the armature of relay 31 by the operation of relay 50. This ground should then be traced through the front contact of relay 31 to the armature of relay 30 and its back contact. Since the back contact of relay 30 is cross connected in the plug 38 to the winding of relay 76 this delay by responding will repair the break in the chain circuit caused by relay 73. The chain circuit is therefore again completely closed with the result that the wiper 45 will be advanced, relay 43 will be released and relay 44 will be operated in its stead.

As indicated, plungers pushing through that part of the indexing card indicated by the numeral 40 and making contact with the plate 42 will ground common conductors 61 to 68, inclusive, 70 and 72. The continuity of the circuit through relay 31 is again tested through the grounding of conductors 61 to 64 inclusive and the chain circuit broken by relays 53 and 55 is repaired by relays 54 and 56.

Through the operation of relays 77 and 78 a circuit to test the continuity of the path through relay 30 is established. In this instance, however, such circuit passes through a line resistance circuit whereby the current may be limited to see if the relay 30 is sufficiently sensitive. Thus the circuit from the winding of relay 79 extends through the armature of relay 77 to conductor 87 whence it eventually leads to conductor 88 thence through the winding of relay 30 to conductor 90 whence it eventually leads to conductor 89, through the contact and armature of relay 78, and the winding of relay 80 to ground.

It will be noted that if neither relay 83 nor relay 85 is energized then conductor 87 is connected directly to conductor 88. However, if relay 85 is energized then resistance 91 is inserted in circuit between conductors 87 and 88. If relay 83 is operated then both resistances 91 and 92 are inserted in this circuit. It is assumed by way of example that conductor 72 has been grounded, thus causing the operation of relays 83 and 84 and the insertion of resistances 91 to 94 inclusive in series with the winding of relay 30.

The operation of relays 79 and 80 will prove the continuity of the circuit through the relay 30 and the consequent operation of relays 58 and 81 will repair the breaks in the chain circuit caused by the operation of relays 57 and 82, respectively.

In this instance relay 73 has not been operated but relay 95 has been operated in its stead to test whether the relay 30 has operated and thereby shifted the ground on its armature from its back to its front contact. If this has properly occurred then relay 96 must operate to repair the break in the chain circuit caused by the operation of relay 95.

In the above example it has been shown how one plurality of tests has been made, and that proving successful how the testing has advanced to another and different plurality of tests. In the example given, only the simplest tests have been described, but it will be understood that very much more complicated circuits may be tested and a great many more tests both in the group controlled by each multicontact relay and by the number of multicontact relays employed.

The above description will suffice to give a clear understanding of the principles of operation of the device embodying the present invention. The following is a more detailed description of the same but explaining precisely certain operations which were only schematically shown in Fig. 2.

Figure 10:
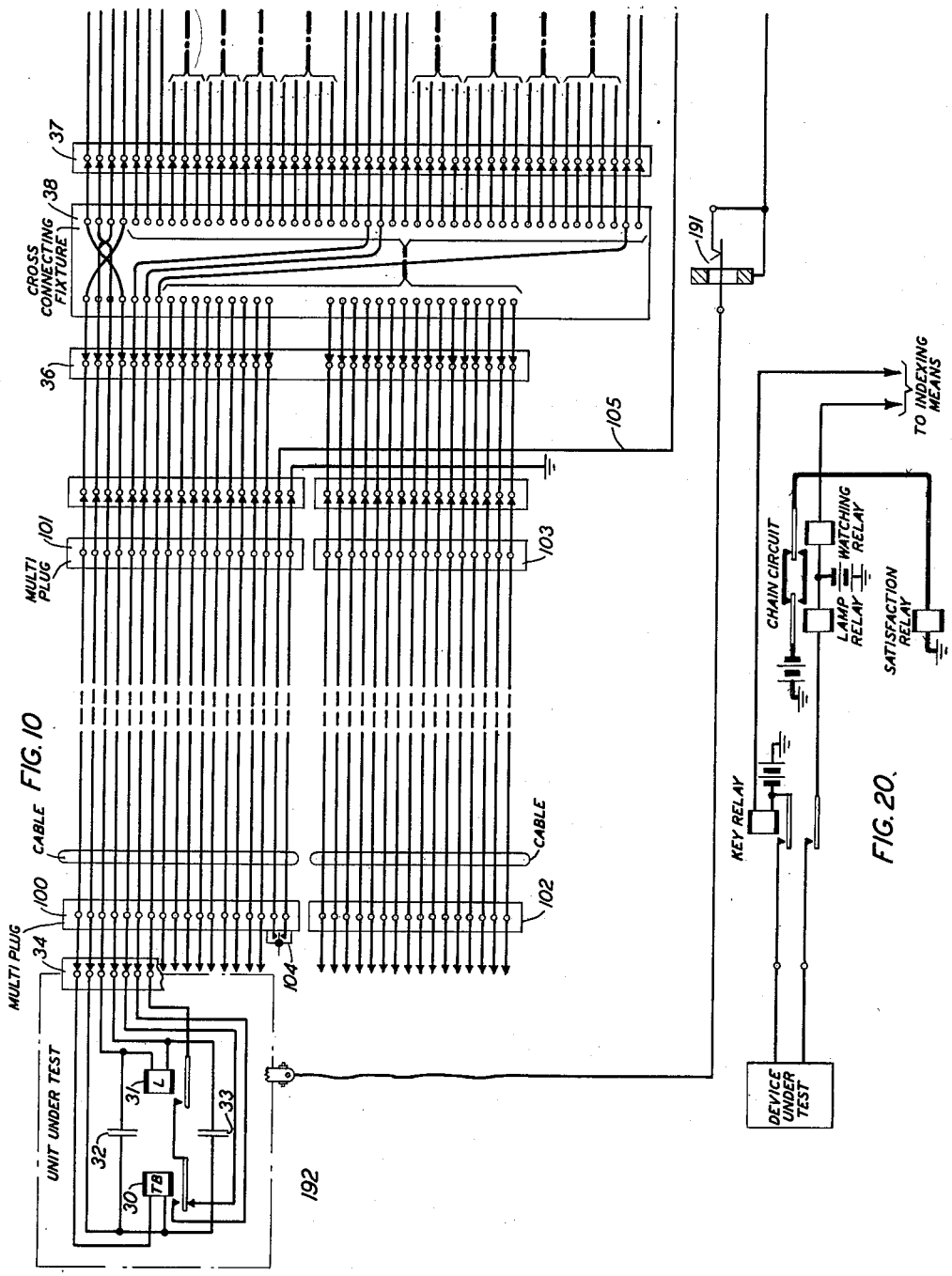
Figure 11:
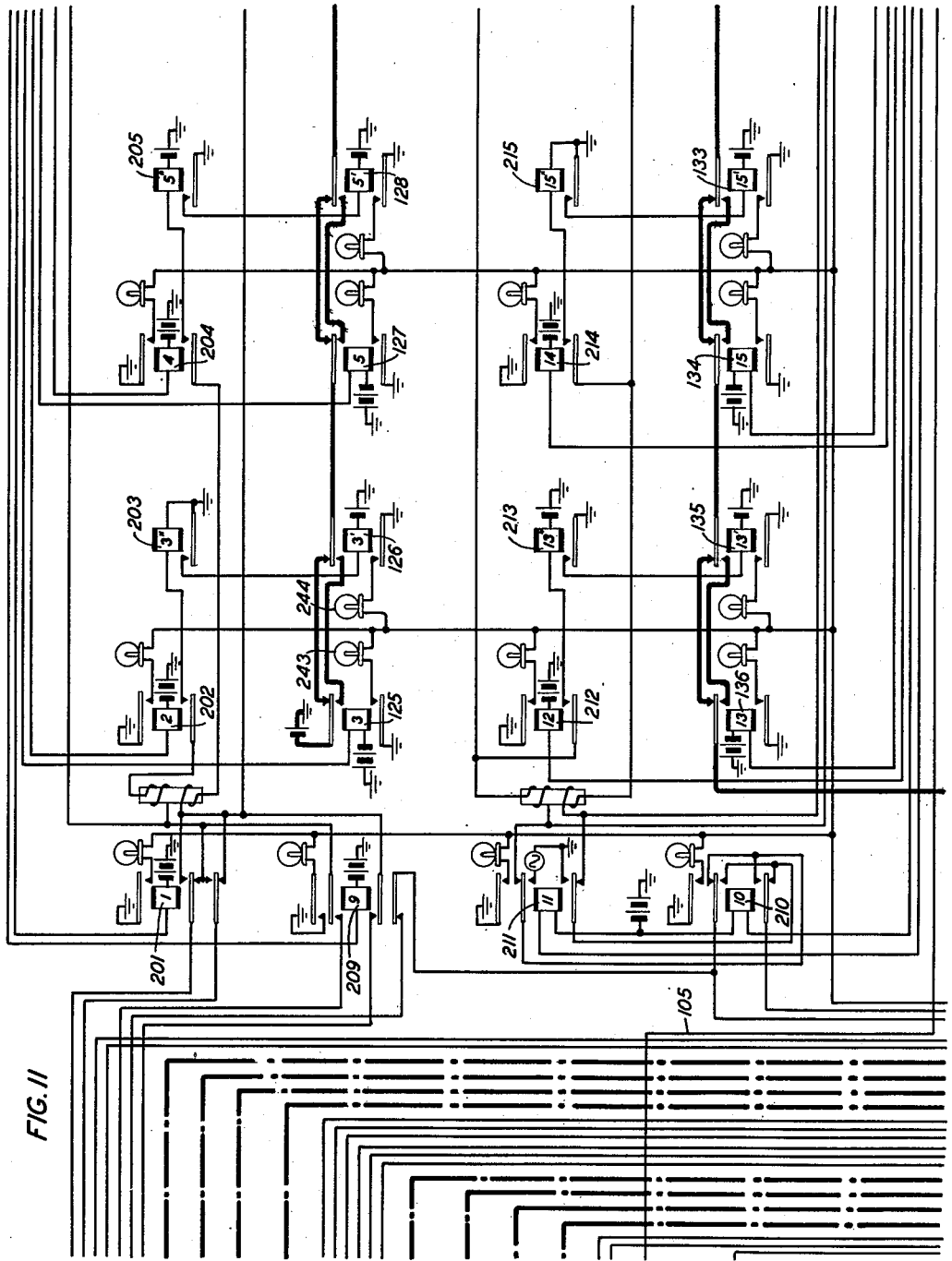

With Figs. 10 to 19 inclusive, arranged as indicated in Fig. 1 a complete diagram of the circuits of the present inventiion is given. The showing in Fig. 10 is much the same as the showing in the upper left-hand corner of Fig. 2. In practice it is found that some apparatus units have a fairly small number of terminals in the block 34 and hence to avoid wear and tear the multiplug 35 of Fig. 2 is divided into two or more and the cable instead of extending directly from the plug 35 to the springs of jack 36 is now double ended. Thus one cable ends in plugs 100 and 101 and another cable ends in plugs 102 and 103. The plug 100 may by way of example be like that shown in my copending application Serial No. 328,644 filed April 9, 1940. The device 104 is a switch which is operated during the operation of placing the plug 100 into cooperative relationship with the terminals of the block 34. It functions as an automatic starting means for the test. The starting conductor 105 may be traced through to Fig. 16 where it joins the path from the start key 106. The device is controlled by what is well known in the art as a W and Z relay combination, described in its first form in Patent 1,438,743 granted December 12, 1922 to E. H. Clark. A momentary ground put on and then taken off of conductor 105 will operate these relays to the "on" position. Another momentary ground put on and then taken off of conductor 105 will operate these relays to the "off" position. With the set operating normally, a satisfaction signal is received, whereupon the plug 100 is removed from the terminal block 34. In this movement a ground is momentarily placed on conductor 105 so that the W and Z relay combination goes to the "off" position and in so doing, as will appear hereinafter, advances the test set to its normal position. Thereafter the plug 100 is placed upon another terminal block in this movement a ground is again momentarily placed on conductor 105 so that the W and Z relay combination goes to the "on" position and the testing of the apparatus unit is started. This switching arrangement 104 is so arranged that if after the plug 100 is removed from one terminal block and then put aside, it will as it is being freed place a momentary ground on conductor 105 twice and thus run the W and Z relay combination through a full cycle of operations so that the test set is not inadvertently started. By the same token, when it is taken up for use again, in opening the jaws of the plug, a momentary ground will be placed on conductor 105 twice and thus run the W and Z relay combination through a full cycle of operations, leaving the test set in normal condition ready to be set in operation.

The W and Z relay combination is shown in Fig. 16. There relay 107 is the W relay and relay 108 is the Z relay. The start key 106 may be operated, whereupon ground is placed on conductor 105 closing a circuit through the normal contact of the upper armature of relay 107, the winding of relay 107, resistance 109 to battery. The relay 107 operates. Relay 108 is short-circuited at this time due to ground on conductor 106 being extended to both terminals of its winding. Relay 107 locks through its upper armature to ground. When the start key 106 is released or the ground on conductor 105 is otherwise removed then the Z relay 108 will be operated, from ground on the upper armature and front contact of relay 107, winding of relay 108, resistance 110 to battery. Thus a single application of ground to conductor 105 will result in the operation of relays 107 and 108 which remain in this operated position.

It may be here noted that another application of ground to conductor 105, results in the short-circuiting of relay 107 and its release, followed on the removal of ground from conductor 105 of the release of relay 108. Thus a second application of ground to conductor 105 results in the release of both relays 107 and 108. It may be said therefore that a single application of ground will place these relays in the "on" position and a second application of ground will place them in the "off" position.

There are two other keys used in the control of this test set. Key 111 is known as the "reset" key and functions both to return the stepper switch to normal by placing battery on the contact bank for wiper 113 and to place ground on conductor 105. This key is only effective when relays 107 and 108 are both operated, for the ground for application to conductor 105 comes from the front contact of the lowermost armature of relay 108. The upper armature of relay 116 operated by the key 111 places battery on the contact bank of wiper 113. If the key 111 should be released before the wiper 113 has entirely returned to normal, then the inner lower armature and back contact of relay 107 will substitute for the upper armature and front contact of relay 116. Thus a momentary depression of key 111 will return the test set to normal and place the relays 107 and 108 in the "off" position.

Key 113 is known as the "retest" key. Operation of this key moves the stepper switch back to normal but leaves the relays 107 and 108 in the "on" position so that the apparatus unit under test will undergo another test. This key need only be depressed momentarily because upon its operation battery will be extended over wiper 113 to operate relay 117 which in turn through its lower armature and front contact places battery on the bank for wiper 113 and which will remain there until wiper 113 reaches normal. The retest key may be usefully employed when some minor defect has been discovered and remedied in the apparatus under test. Thereupon the device is retested by the operation of this key.

The indexing card, the grounded plate and the coordinate array of plungers are shown schematically in a fragmentary perspective form in the upper right-hand corner of Fig. 13. The multicontact relays are indicated by the relays 118, 119 and 120 each with its array of contacts extending to the right thereof. The common conductors which are in turn connected to each group of plungers by these relays extend upwardly to a bracket leading by a broken line to various parts of the chain circuit. Each multicontact relay is shunted by a varistor which offers no hindrance to the energizing current but which will slow the release of the relay by offering a low resistance shunt about the relay winding. These varistors also prevent arcing at the terminals of wiper 124 as this wiper moves from one terminal to another.

It will be noted that each multicontact relay serves a horizontal row of plungers. The last contact to the right on each relay is connected to the first plunger to the left in the corresponding row of plungers. The indexing card will have at least the first position (reading from the left) in each row punched out so that upon the operation of any of the multicontact relays a ground will be placed on conductor 121 leading to the bank contacts for wiper 122. The purpose of having the first position in each row punched out is to insure that the card is fully seated in each operation. Otherwise the testing device upon the operation of the start key, if a card was not inserted and none of the plungers were making contact, would function as though connected to a satisfactory circuit. Wiper 122 is a non-bridging type and hence the ground standing on this wiper is momentarily interrupted each time the wiper moves from contact to contact. The purpose of this interrupted ground supply will appear hereinafter.

The chain circuit extends from battery connected to the armature of relay 125 through the contacts and armatures of relays 125 to 159, inclusive, thence over conductor 160, through the back contact and lower armature of relay 161 to the winding of satisfaction relay 162. The ground connected to the other side of this relay will be described hereinafter. The various tests which may be made by the various relays of the chain circuit will also be set forth in detail hereinafter.

The control circuit will first be described. When the control circuit is in normal position the "normal" lamp 163 flashes. The circuit therefor may be traced from ground, wiper 123 and its first contact, back contact and upper armature of relay 108, outer upper armature and back contact of relay 107, lamp 163 and interrupter 164 to battery. The flashing lamp indicates that the control circuit is normal and is awaiting the operation of the start key.

When the start key has been operated the W and Z relays go to the "on" position as hereinbefore described. The operation of these two relays extinguishes the lamp 163. A circuit is also established from battery through condenser 165 and in parallel therewith relay 166 and resistance 167, thence over resistance 168, lower armature and back contact of relay 169, wiper 114 and its first contact, back contact and armature of satisfaction relay 162, outer lower armature and front contact of relay 107, wiper 122, to conductor 121, and to ground thereon as soon as any one of the relays 118 to 120 are operated. The operation of relays 107 and 108 also operate relay 159 in a circuit from ground, winding of relay 159, front contact and inner lower armature of relay 107 to battery. This same battery connection extends over wiper 124 and its first contact to multicontact 118 so that now ground is placed on wiper 122 with the consequence that condenser 165 is slowly charged but relay 166 is not operated under normal conditions as this circuit is not maintained closed for a sufficient period. Ground on the back contact of relay 166 is extended to the other side of satisfaction relay 162 so that as relay 159 closes the chain circuit to satisfaction relay 162 this relay operates.

The multicontact relay 118 connects those test features relays designated by the punching in the top horizontal row of the indexing card to ground and the chain circuit is immediately broken at a number of points. Each separate test as it proves satisfactory repairs one of these breaks in the chain circuit. If the equipment under test responds correctly then all breaks in the chain circuit will be repaired and relay 162 will operate.

The operation of relay 162 removes ground from the winding of relay 166 before this relay can operate under normal conditions so that the ground for operating relay 162 is maintained. Relay 162 connects ground on its armature to its front contact and to the outer lower armature and back contact of relay 170, the back contact and armature of selector stepping magnet 171 through the winding of relay 172 to battery. Relay 172 operates and extends the ground from the back contact of relay 170 through the armature and front contact of relay 172 to the winding of relay 173 which operates and further extends this ground to the stepping magnet 171. The stepping magnet opens the circuit of relay 172. The stepping magnet in releasing moves all the wipers to their next positions. Wiper 124 is of the bridging type and in its movement from one position to the next will insure that multicontact relay 119 for instance will operate before relay 118 releases. Wipers 113, 114, 115 and 123 perform no useful function at this time. Wiper 122 however will momentarily open the ground leading therefrom to insure that the stepping magnet 171 is not again operated until the wipers have become properly centered on their next contacts. The multi-contact relay 119 connects the test feature relays designated by the indexing card to ground and the chain circuit is again opened, resulting in the release of relay 162 and the consequent energization of relay 166 before this has had time to release.

Another plurality of tests designated by the second horizontal row of holes punched in the indexing card will be made and if these are satisfactory the same cycle of operations will be repeated and the selector switch advanced to its next position. In this manner the switch is advanced step by step until it reaches position 21. Here a circuit is established from ground 123, its 21st contact, satisfaction signal 174 to interrupter 164 and thence to battery whereupon the satisfaction signal is caused to flash at a rate determined by the said interrupter, as a visual indication that a complete test on the equipment under test has been performed. Another circuit is established from ground, wiper 115 and its 21st contact through the back contact and outer upper armature of relay 117, winding of relay 170 to battery, to operate relay 170. The operation of relay 170 opens the circuit for the stepping magnet 171, connects battery to the counter magnet 175 and operates the buzzer 176, if the switch 177 is closed, as an audible signal that a complete test has been made.

If in any position of selector positions 1 to 20, the test applied does not receive the correct response from the equipment under test, the chain circuit will not be closed and the relay 162 will remain deenergized. Thus the ground applied to relay 166 will be maintained for a period sufficient to fully charge the condenser 165 and to energize relay 166. Upon the operation of relay 166 a circuit is closed from ground, interrupter 178, lower armature and front contact of relay 166, armature and back contact of relay 179 winding of relay 180 to battery. Upon the first closure of interrupter 178, thereafter, relay 180 becomes energized and closes a circuit from ground upper armature and front contact of relay 166, armature and front contact of relay 180 to the winding of relay 179 but this relay is now short-circuited by the connection of ground to its other terminal through the interrupter 178. When the circuit through interrupter 178 next becomes open, then relays 179 and 180 will operate in series and the circuit from interrupter 178 will be transferred to the winding of relay 169 which has battery connected to its other terminal at the front contact of relay 107. When the circuit through interrupter 178 is again closed relay 169 operates and locks to ground on wiper 115 through resistance 181. Relay 169 opens the circuit of relay 166 but relay 169 remains operated. Upon the release of relay 166 a circuit is closed from ground upper armature and back contact of relay 166, inner upper armature and front contact of relay 169 to the winding of trouble relay 161. The trouble relay opens the chain circuit to prevent any further operations should the chain circuit now become closed or become closed during inspection of the apparatus under test to discover the cause of the failure. The trouble relay also closes a circuit to the bell 182 to give an audible signal that a trouble condition has been encountered, operates counter 183 to record such encounter and places battery on conductor 184. It will be noted that conductor 184 extends throughout Figs. 11, 12, 14, 15, 16, 17 and 18 and acts as a supply lead to the many signal lamps shown therein. Thus when a trouble condition is encountered, an audible common signal is displayed and a visual individual signal is displayed to indicate quickly the seat of the trouble. The working of these individual signal lamps will be explained hereinafter.

Attention is directed to relays 185 to 188, inclusive, known as the false potential relays. It will be noted that a circuit exists from battery through the winding of relay 185, resistances 189 and 190 the winding of relay 186 to ground. Due to the value of these resistances neither of these relays will operate. However, the mid-point of this circuit is connected to the false potential jack 191 (Fig. 10) from which a conductor ending in a clip 192 may be connected to the framework under test. In some types of apparatus units the framework thereof is entirely insulated from the apparatus mounted thereon and so it becomes important to test such framework during the test of the unit to see that it is not or does not become crossed with either ground or battery. Relay 185 will respond to ground on the framework and relay 186 will respond to battery on the framework. Either will operate its companion relay, display its associated signal lamp and cause the operation of the trouble relay 161.

The relay 193 and the jack 194 are provided for the use of the attendant in locating trouble. Conductors connected to the jack are connected to a test pick which may be used to explore different points in the circuit of the apparatus under test. Operation of relays 193 and 195 will cause the operation of buzzer 176. It is not necessary to further describe this apparatus as it is an auxiliary and manually operated piece of apparatus not performing any important function in the invention but is shown here to render the disclosure complete.

When a trouble condition has been cleared it is necessary to operate either the reset key 111 or the retest key 112. If the reset key 111 is operated the switch wipers 113 and so forth will be returned to their number 1 contacts and the W and Z relay combination will be shifted to the "Off" position. Thereafter an operation of the start key 106 will start a new testing operation. If the retest key 112 is operated the wipers will be returned to their number 1 positions but the W and Z relay combination will be left in the "on" position so that a new testing operation is started immediately and automatically.

The various controls having now been disclosed and the principle of operation of the chain circuit having been explained a description of certain of the test features will be given.

In Fig. 18 a line resistance circuit is shown in greater detail than in Fig. 2. Here a combination of nine resistance coils and four connecting relays is used for each side of the line. With eight of each set of resistances being of 500 ohms each and the ninth of 1000 ohms these relays may be operated in combinations to insert from 0 to 5000 ohms in each conductor of the line circuit. The bundle of four conductors 196 may be grounded in various combinations by the selectively punched holes in the indexing card. A companion set of four relays will operate one of the signal lamps starting with 197. The display key 246 will place battery on conductor 184 at any time if the operator wishes to check the setting of these relays and learn the value of the resistance inserted in the line under test. It will be understood that the resistance values given above are by way of example only.

Relays 201, 202, 204, 206, 207, 209, 210, 211, 212, 214, 216, 218, 219, 220, 221, 223, 225, 227, 236, 237, 238 and 239 perform the functions performed by keys in manual type test sets and are therefore called "key relays" and are controlled by the test selection circuit. It will be noted that each of these relays is connected to one of the common conductors multipled to the contacts of the multicontact relays.

Relay 201 performs the function of a reversing key. In the example given the ground through the winding of relay 203 and the battery through the winding of relay 205 is connected to the winding of relay 31 under test. By the operation of relay 201 the flow of current through relay 31 may be reversed.

Relay 202 connects ground through the winding of relay 203 to the first test set termination in the jack 37 and relay 204 connects battery through the winding of relay 205 to the second of such terminations, the two forming an associated pair.

Relay 206 connects this pair to a receiving device, relay 198 and its condenser 199.

Relay 207 connects this pair to a source of tone consisting of a repeating coil 240 and an interrupter 241, which is caused to operate by the action of relay 207.

Relay 209 connects this pair to other test set terminations for purposes with which test men are familiar. Relay 209 also opens the continunity between a test set termination and the tip of the line side of the test circuit (connected to the inner upper armature of relay 210).

Relay 210 performs the functions of a reversing key on the line tip and ring.

Relay 211 performs the functions of a ringing key by connecting ringing current to the test set terminations outgoing from the line resistance circuit of Fig. 18. Thus a pair of test set terminations lead to the line resistance circuit and therethrough to relay 211 whence normally this circuit passed through a retardation coil to a pair of line conductors ending in relay 216.

Relay 212 connects battery through relay 213 to the ring of this line and relay 214 connects ground through relay 215 to the tip of this line.

Relay 216 connects the high-low resistance relay 217 to this line. Relay 218 functions to short circuit the high resistance winding of relay 217.

Relay 219 connects the line from the back contacts of relay 211 to the receiving relay 198.

Relay 220 connects the output side of the tone circuit to this line and like relay 207 puts the interrupter 241 into operation.

Relay 221 closes battery to a test set termination ground to another and transfers a third from connection to relay 222 to connection to relay 158.

Relay 223 closes battery and ground to a pair of test set terminations and closes an associated test set termination through to the winding of relay 139 to battery.

Relay 225 closes battery and ground to a pair of test set terminations and closes an associated test set termination through to the winding of relay 141 to ground.

Relay 227 closes ground to one of a group of test set terminations, transfers a second from a third to a fourth and closes a fifth to the winding of relay 143 to ground.

Relay 236 closes ground and battery to a first and a second and connects a third to a fourth in an associated group of test set terminations.

Relay 237 closes ground and battery to a first and second and transfers a third from a fourth to a fifth of an associated group of test set terminations.

Relay 238 closes ground and battery to a first and second and ground through a resistance 242 to a third of an associated group of test set terminations.

Relay 239 performs the same function as relay 237 with another group of five test set terminations.

Relays 126, 128, 129, 135, 133, 137, 139, 141, 143, 158, 156, 154, 152, 150, 148 and 146 perform the functions of the lamps in the manual type sets and are therefore called lamp relays and are under control of the equipment under test.

The companion relays 125, 127, 130, 136, 134, 132, 138, 140, 142, 144, 157, 155, 153, 151, 149, 147 and 145 respectively perform the functions of the tester in watching the lamps and are therefore called watching relays and are under control of the indexing card.

Relay 203 operates from battery on the first set termination when relay 201 is normal and from battery on the second test set termination when relay 201 is operated. Relay 203 will cause the operation of relay 126 to repair a break in the chain circuit caused by the operation of relay 125 under control of the indexing means.

Lamp 243 associated with relay 125 and lamp 244 associated with relay 126 will serve to indicate trouble. If when trouble is encountered and battery is placed on conductor 184 both these lamps are lighted then it indicates that this particular test has responded satisfactorily. If the watching lamp 243 is lit but the companion lamp 244 is dark it indicates that battery has not been returned to relay 203 as it should have been. In general where there are paired lamps the lighting of either lamp individually indicates a circuit failure. As these lamps are arranged the top lamps of a pair of lamps (lamp 243 of the pair 243 and 244) is under control of the relay which in turn is under control of the test selection circuit and is therefore the condition which should be met as this is predetermined by the engineer in planning the tests. When the bottom lamp lights independently of the top lamp it indicates that some false condition is being received from the equipment under test. When the top lamp lights individually it indicates that the proper response is not being received and may indicate an open circuit.

Relay 205 and its associated relays operate as relay 203 and its associated relays. Relay 205 supplies battery and responds to ground from the equipment under test. Relays 203 and 205 may be involved in a series connection in the manner described in connection with Fig. 2.

As stated above the operation of either relay 207 or relay 220 connects ground to one terminal of the tone repeating coil 240 and causes the interrupter 241 to operate. The tone thus produced may by relays 207 or 220 be connected to either of two pairs of conductors leading to circuits under test. If a path between these two pairs exists in the circuit under test then the tone from repeating coil 240 may be transmitted on one such pair and received on the other where it will operate the relay 198 which is designed to respond to such tone. Thus the transmission path through a circuit under test may be proved. Relay 245 responds steadily to relay 198 even though this latter relay may respond to the separate pulses of the tone. Relay 129 responds to relay 243 and relays 129 and 130 function as other watching and lamp relays.

The purpose of relays 222 and 244 is to provide a means for detecting a momentarily opened ground circuit on the test termination leading from the inner upper armature of relay 221. With ground connected to this termination by the equipment under test relay 222 operates but relay 244 is short-circuited by ground on wiper 122. If the ground which operates relay 222 is momentarily opened, then relays 222 and 244 operate and lock in series and remain in this condition until another multicontact relay is operated and the ground on wiper 122 is momentarily opened. At this time relays 222 and 244 release in preparation for some other test which may be designated by the next row of punched holes in the indexing card.

With several examples given, particularly in connection with the schematic diagram of Fig. 2, of how the various test features are employed it will be apparent how the remainder above described may be used. The engineer who devises an apparatus unit plans the tests to be made and prepares information by which the cross-connecting plug 38 may be wired and the indexing card punched. The indexing means then properly prepared may be stored ready for use when the corresponding apparatus units have been manufactured and reach the point where they are to be tested. It is a matter of very little time to put such indexing means in place and it is a matter of only a few seconds to make the test. Providing that the apparatus unit is in good condition, the test is entirely automatic and all the attendant has to do is to make the proper plug connection to the terminal block of an apparatus unit and then observe the satisfaction signal. When this is given the plug is transferred to another unit and the operation repeated.

What is claimed is:

1. In a test device, an indexing means for determining the nature of a plurality of operations to be performed, said indexing means being removable and replaceable by other indexing means each differently arranged for determining the nature of other and different pluralities of operations to be performed, a plurality of control members operated in different combinations by said different indexing means, means controlled by said indexing means through said operated control members for successively and automatically initiating a plurality of operations, means responsive to the successful completion of one plurality of operations to advance to another plurality of operations and a satisfaction signal responsive to the successful completion of all operations specified by said indexing means.

2. In a test device, an indexing means for determining the nature of a plurality of testing operations to be performed, said indexing means being removable and replaceable by other indexing means each differently arranged for determining the nature of other and different pluralities of testing operations to be performed, a plurality of control members operated in different combinations by said different indexing means, means controlled by said indexing means through said operated control members for successively and automatically performing a series of tests, means responsive to the successful completion of one plurality of tests to advance to another plurality of tests and a satisfaction signal responsive to the successful completion of all tests specified by said indexing means.

3. In a test device, an indexing means for determining the nature of a plurality of testing operations to be performed, said indexing means being removable and replaceable by other indexing means each differently arranged for determining the nature of other and different pluralities of testing operations to be performed, a plurality of control members operated in different combinations by said different indexing means, means controlled by said indexing means through said operated control members for automatically and successively performing a series of groups of tests, the tests of each group being made simultaneously, means responsive to the successful completion of one group of tests to advance to another group of tests and a satisfaction signal responsive to the successful completion of all tests specified by said indexing means.

4. In a test device, an indexing means for determining the nature of a plurality of testing operations to be performed, said indexing means being constructed of insulating material and having perforations cut therein at selectively predetermined points thereof arranged in coordinate rows, electrical connectors for each coordinate point thereof arranged to make electrical connections through said perforations, a multicontact relay for each coordinate row for connecting the said connectors of said row to an equal number of common conductors, said common conductors, means connected to said conductors to make a plurality of tests, means responsive to the successful completion of said plurality of tests for releasing one of said multicontact relays and for operating another, whereby the tests specified by the perforations of each said row are performed in sequence, and a satisfaction signal responsive to the successful completion of all tests specified by said indexing means.

5. In a test device, an indexing means for determining the nature of a plurality of testing operations to be performed, said indexing means being constructed of insulating material and having perforations cut therein at selectively predetermined points thereof arranged in coordinate rows, electrical connectors for each coordinate point thereof arranged to make electrical connections through said perforations, a multicontact relay for each coordinate row for connecting the said connectors of said row to an equal number of common conductors, said common conductors, means connected to said conductors to make a plurality of tests, a step-by-step switch for operating said multicontact relays one at a time, means responsive to the successful completion of a plurality of tests for advancing said step-by-step switch and a satisfaction signal responsive to the successful completion of all tests specified by said indexing means.

6. In a test device for testing various electrical circuits each said circuit terminating in a standard terminal block, a clamping device for clamping said terminal block and for making an electrical connection to each terminal of said block, an indexing means for determining the nature of a plurality of tests to be made on the said electrical circuit connected to said terminal block, said indexing means being constructed of insulating material and having a plurality of perforations cut therein at selectively predetermined points arranged in coordinate rows and being further prearranged to make tests appropriate to the particular electrical circuits connected to said terminal block, said indexing means being removable and replaceable by other similar means prearranged to correspond to other electrical circuits to be tested, electrical connectors in said device for making electrical connections in accordance with the said perforations of said indexing means, said electrical connectors being operated in different combinations by said different indexing means, means connected to said connectors for successively and automatically making a plurality of tests on said connected electrical circuit, means responsive to the successful completion of one plurality of tests for advancing to another plurality of tests and a satisfaction signal responsive to the successful completion of all tests specified by said indexing means.

7. In a test device, an indexing means for determining the nature of a plurality of testing operations to be performed, said indexing means being removable and replaceable by other indexing means each differently arranged for determining the nature of other and different pluralities of tests to be made, means controlled by said indexing means for automatically and successively making a series of groups of tests, the tests of each group being made simultaneously, a chain circuit controlled by said testing means, said chain circuit being closed only when all tests of a group are successfully completed, means controlled by said chain circuit for advancing to another group of tests and a satisfaction signal responsive to the successful completion of all tests specified by said indexing means.

8. In a test device, an indexing means for determining the nature of a plurality of testing operations to be performed, said indexing means being removable and replaceable by other indexing means each differently arranged for determining the nature of other and different pluralities of tests to be made, means controlled by said indexing means for automatically and successively making a series of groups of tests, the tests of each group being made simultaneously, a chain circuit controlled by said testing means, said chain circuit being normally closed through a series of first alternate paths, a companion second alternate path for each said first alternate path, each said pair of alternate paths being responsive to a separate test of a group of tests, means controlled by said chain circuit when closed through a plurality of said second alternate paths indicating the successful completion of all tests of a group to advance to another group of tests and a satisfaction signal responsive to the successful completion of all tests specified by said indexing means.

9. In a test device, an indexing means for determining the nature of a plurality of testing operations to be performed, said indexing means being removable and replaceable by other indexing means each differently arranged for determining the nature of other and different pluralities of tests to be made, means controlled by said indexing means for automatically and successively making a series of groups of tests, the tests of each group being made simultaneously, a chain circuit normally closed through a series of first alternate paths, a companion second alternate path for each said first alternate path, each said pair of alternate paths being controlled by a relay responsive to the successful completion of a single test and a companion relay responsive to said indexing means, means controlled by said chain circuit when closed through a plurality of said companion second alternate paths indicating the successful completion of all tests of a group to advance to another group of tests and a satisfaction signal responsive to the successful completion of all tests specified by said indexing means.

10. In a test device, an indexing means for determining the nature of a plurality of testing operations to be performed, said indexing means being removable and replaceable by other indexing means each differently arranged for determining the nature of other and different pluralities of tests to be made, means controlled by said indexing means for automatically and successively making a series of groups of tests, the tests of each group being made simultaneously, said means comprising a chain circuit normally closed through a series of first alternate paths, a companion second alternate path for each said first alternate path, each said pair of alternate paths being controlled by a relay responsive to the successful completion of a single test and a companion relay responsive to said indexing means, a relay responsive to said indexing means for closing a circuit to perform said test, means controlled by said chain circuit when closed through a plurality of said companion second alternate paths indicating the successful completion of all tests of a group to advance to another group of tests and a satisfaction signal responsive to the successful completion of all tests specified by said indexing means.

11. In a test device, an indexing means for determining the nature of a plurality of testing operations to be performed, said indexing means being removable and replaceable by other indexing means each differently arranged for determining the nature of other and different pluralities of tests to be made, means controlled by said indexing means for automatically and successively making a series of groups of tests, the tests of each group being made simultaneously, said means comprising a chain circuit normally closed through a series of first alternate paths, a companion second alternate path for each said first alternate path, each said pair of alternate paths being controlled by a relay responsive to the successful completion of a single test and a companion relay responsive to said indexing means, a relay responsive to said indexing means for closing a circuit to perform said test, a step-by-step means responsive to said chain circuit, said step-by-step means rendering effective a different portion of said indexing means on each step thereof whereby a different group of tests is made on each said step thereof and a satisfaction signal responsive to the successful completion of all tests specified by said indexing means.

12. In a test device, an indicating means for determining the nature of a plurality of testing operations to be performed, said indexing means being removable and replaceable by other indexing means each differently arranged for determining the nature of other and different pluralities of tests to be made, means controlled by said indexing means for automatically and successively making a series of groups of tests, the tests of each group being made simultaneously, said means comprising a chain circuit normally closed through a series of first alternate paths, a companion second alternate path for each said first alternate path, each said pair of alternate paths being controlled by a relay responsive to the successful completion of a single test and a companion relay responsive to said indexing means, a relay responsive to said indexing means for closing a circuit to perform said test, a signal for each of said relays for indicating the operation thereof, a step-by-step means responsive to said chain circuit, said step-by-step means rendering effective a different portion of said indexing means on each step thereof whereby a different group of tests is made on each said step thereof and a satisfaction signal responsive to the successful completion of all tests specified by said indexing means.

13. In a test device, an indexing means for determining the nature of a plurality of testing operations to be performed, said indexing means being removable and replaceable by other indexing means each differently arranged for determining the nature of other and different pluralities of tests to be made, means controlled by said indexing means for automatically and successively making a series of groups of tests, the tests of each group being made simultaneously, said means comprising a chain circuit normally closed through a series of first alternate paths, a companion second alternate path for each said first alternate path, each said pair of alternate paths being controlled by a relay responsive to the successful completion of a single test and a companion relay responsive to said indexing means, a relay responsive to said indexing means for closing a circuit to perform said test, signal means for indicating the failure of any of said relays to operate whereby the cause of the stoppage of the automatic operation of said testing device due to the opening of said chain circuit may be readily determined, a step-by-step means responsive to said chain circuit, said step-by-step means rendering effective a different portion of said indexing means on each step thereof whereby a different group of tests is made on each said step thereof and a satisfaction signal responsive to the successful completion of all tests specified by said indexing means.

14. In a test device, a test circuit terminating in terminals of a terminal block, a device to be tested comprising a circuit arrangement terminating in terminals of a terminal block, means for cross-connecting said terminals of said blocks in a prearranged pattern to correspond to the particular device to be tested, an indexing means for determining the nature of a plurality of testing operations to be performed, said indexing means being removable and replaceable by other indexing means each differently arranged for determining the nature of other and different pluralities of testing operations to be performed, means controlled by said indexing means for successively and automatically making a series of tests, means responsive to the successful completion of one plurality of tests to advance to another plurality of tests and a satisfaction signal responsive to the successful completion of all tests specified by said indexing means.

15. In a test device, a test circuit terminating in terminals of a terminal block, a device to be tested comprising a circuit arrangement terminating in terminals of a terminal block, an indexing means for determining the nature of a plurality of testing operations to be performed, said indexing means being removable and replaceable by other indexing means each differently arranged for determining the nature of other and different pluralities of testing operations to be performed, a plurality of control members operated in different combinations by said different indexing means, said indexing means including means to establish a predetermined pattern of cross-connections between the said terminals of said terminal blocks, means controlled by said indexing means through said control members for successively and automatically making a series of tests, means responsive to the successful completion of one plurality of tests to advance to another plurality of tests and a satisfaction signal responsive to the successful completion of all tests specified by said indexing means.

16. In a test device, a test circuit terminating in terminals of a terminal block, a device to be tested comprising a circuit arrangement terminating in terminals of a terminal block, said terminal blocks being mounted adjacent one another, a jig having connecting terminals which may be placed into cooperative relationship with the terminals of said terminal blocks, said connecting terminals of said jig being variously interconnected in a prearranged pattern to correspond to the particular device to be tested, an indexing means for determining the nature of a plurality of testing operations to be performed, said indexing means and said jig being removable and replaceable by other indexing means and jigs each differently arranged for determining the nature of other and different pluralities of testing operations to be performed, means controlled by said indexing means for successively and automatically making a series of tests, means responsive to the successful completion of one plurality of tests to advance to another plurality of tests and a satisfaction signal responsive to the successful completion of all tests specified by said indexing means.

17. In a test device, a test circuit terminating in the springs of a jack, a device to be tested comprising a circuit arrangement terminating in the terminals of a terminal block, a jig having a plurality of terminals, said jig being capable of being placed in cooperative relationship with said terminal block so that each terminal of said terminal block will make electrical contact with a corresponding terminal of said jig, each terminal of said jig being connected to a spring of said jack, a plug for cooperative connection with said jack, said plug having a connecting member corresponding to each spring of said jack, the connecting members of said plug being cross-connected in a prearranged pattern to correspond to the particular device to be tested and being removable and replaceable by other plugs each being cross-connected in a different prearranged pattern to correspond to other and different devices to be tested, an indexing means for determining the nature of a plurality of testing operations to be performed, said indexing means being removable and replaceable by other indexing means each differently arranged for determining the nature of other and different pluralities of testing operations to be performed, means controlled by said indexing means for successively and automatically making a series of tests, means responsive to the successful completion of one plurality of tests to advance to another plurality of tests and a satisfaction signal responsive to the successful completion of all tests specified by said indexing means.

18. In a test device, a test circuit terminating in the springs of a jack, a device to be tested comprising a circuit arrangement terminating in the terminals of a terminal block, a jig having a plurality of terminals, said jig being capable of being placed in cooperative relationship with said terminal block so that each terminal of said terminal block will make electrical contact with a corresponding terminal of said jig, each terminal of said jig being connected to a spring of said jack, a plug for cooperative connection with a said jack, said plug having a connecting member corresponding to each spring of said jack, the connecting members of said plug being cross-connected in a prearranged pattern to correspond to the particular device to be tested, an indexing means for determining the nature of a plurality of testing operations to be performed, said indexing means and its companion plug being removable and replaceable by other pairs of indexing means and plugs each differently arranged and cross-connected in a different prearranged pattern to correspond to other devices to be tested, said plugs controlling the manner in which said device to be tested is connected to said test circuit and said indexing means controlling said test circuit to successively and automatically make a series of tests on said device to be tested, means responsive to the successful completion of one plurality of tests to advance to another plurality of tests and a satisfaction signal responsive to the successful completion of all tests specified by said indexing means.

19. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, and a satisfaction means responsive to the joint operation of said observing means and said last means for reporting the success of a specific test.

20. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, and a satisfaction means responsive to the joint operation of said observing means and said last means for reporting the success of the tests made by all testing features employed, said satisfaction means being common to said testing features.

21. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a satisfaction means responsive to the joint operation of said observing means and said last means for reporting the success of the tests made by all testing features employed, said satisfaction means being common to said testing features and means individual to each testing feature for reporting the success or failure of the specific test performed by said testing feature.

22. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a satisfaction means responsive to the joint operation of said observing means and said last means of each said testing feature for reporting the success of a group of tests simultaneously made by a plurality of testing features, trouble indicating means and an individual signaling means for each test feature, the said trouble indicating means giving notice that trouble has been encountered and the said individual signaling means giving the approximate location of the trouble encountered.

23. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a satisfaction means responsive to the joint operation of said observing means and said last means of each said testing feature for reporting the success of a group of tests simultaneously performed by a plurality of said testing features, a general failure signal responsive to said satisfaction means and a specific failure signal associated with and responsive to each said testing feature.

24. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a specific failure signal associated with and responsive to said testing feature, a satisfaction means responsive to the joint operation of said observing means and said last means of each said testing feature for reporting the success of a group of tests simultaneously performed by a plurality of said testing features, a general failure signal responsive to said satisfaction means and display means controlled by said satisfaction means for rendering said specific failure signals effective.

25. In a test device, an indexing means for determining the nature of a plurality of testing operations to be performed, said indexing means being removable and replaceable by other indexing means each differently arranged for determining the nature of other and different pluralities of testing operations to be performed, a plurality of testing features each arranged to perform and report the success or failure of a specific test, each said testing feature comprising means for imposing a test condition on a device under test under control of said indexing means, a means for observing the reaction of said device under test to said imposed condition and a means under control of said indexing means for imposing on said test feature a condition to be matched by said observing means, a specific failure signal associated with and responsive to each said testing feature, said specific failure signals being included in a common and normally open circuit, and means responsive to the operation of said general failure signal for closing said normally open circuit.

JOHN H. SULZER.